United States Patent [19]

Barmache et al.

[11] 4,237,501

[45] Dec. 2, 1980

[54] EMERGENCY HEAD UNLOAD SYSTEM FOR MAGNETIC DISK DRIVE

[75] Inventors: Evan L. Barmache, Northridge; Abraham Brand, Encino, both of Calif.

[73] Assignee: Pertec Computer Corporation, Los Angeles, Calif.

[21] Appl. No.: 45,924

[22] Filed: Jun. 6, 1979

Related U.S. Application Data

[63] Continuation of Ser. No. 927,763, Jul. 25, 1978, abandoned.

[51] Int. Cl.² .................. G11B 5/54; G11B 17/00; G11B 21/08
[52] U.S. Cl. .................................. 360/75; 360/105
[58] Field of Search .............................. 360/75, 77-78, 360/97-98, 105-106; 318/685, 687, 612

[56] References Cited

U.S. PATENT DOCUMENTS

| | | | |
|---|---|---|---|
| 3,634,836 | 1/1972 | Huetten et al. | 360/105 |
| 3,702,997 | 11/1972 | Jamleson | 360/105 |
| 3,713,121 | 1/1973 | Fasano et al. | 360/105 |
| 3,814,441 | 6/1974 | Craggs | 360/105 |
| 4,005,485 | 1/1977 | Opocensky | 360/75 |

Primary Examiner—Alfred H. Eddleman
Attorney, Agent, or Firm—Freilich, Hornbaker, Wasserman, Rosen & Fernandez

[57] ABSTRACT

Circuit means for use in a moving head type magnetic disk drive for unloading the heads under emergency conditions, such as power loss, to avoid loss of data and head or disk damage. The circuit means include a dynamic brake circuit which responds to an emergency condition to electrically short a positioner coil to thereby reduce the head support structure radial velocity to substantially zero. After a short delay, a velocity control circuit is activated, first in a low current mode to move the support structure at a controlled velocity toward the disk outer edge and then in a high current mode to enable the support structure to climb an unload ramp to move the heads axially away from the disk surface. The dynamic brake and velocity control circuits are powered by a capacitor which is charged during normal operation.

11 Claims, 2 Drawing Figures

EMERGENCY HEAD UNLOAD SYSTEM FOR MAGNETIC DISK DRIVE

This application is a continuation of Ser. No. 927,763, July 25, 1978, now abandoned.

BACKGROUND OF THE INVENTION

This invention relates generally to magnetic disk drives and more particularly to an improved emergency head unload system for use therein.

Modern moving head magnetic disk drives generally employ heads carried by a support structure coupled to a positioner motor. The positioner motor typically includes a coil mounted within a magnetic field for linear movement and oriented relative to the disk to move the heads radially over the disk surface to thereby enable the heads to be positioned over any annular track on the surface. The heads are designed to actually fly above the disk recording surface at heights of less than 100 microinches. If, during normal operation of the drive, power is lost causing the disk rotational speed to gradually decrease, the heads cannot continue to fly and would ultimately crash into the disk surface. In order to protect the data, the heads and the disk, it is necessary to remove the heads from the disk surface as fast as possible when a power fault is detected. The process of removing the heads from the disk in an emergency situation is referred to as an emergency unload procedure and requires that the head support structure be moved radially toward the disk outer track to axially move the heads away from the disk surface. Although loss of power is probably the primary reason for initiating the emergency unload procedure, the procedure is typically also initiated when the following conditions are encountered:

(1) Disc speed does not remain within tolerance;
(2) Positioner error is detected;
(3) Write circuit faults that could effect stored data are detected.

Essentially all modern disk drives incorporate some system for executing an emergency unload procedure in order to avoid loss of data and prevent disk and/or head damage. In a typical prior art emergency unload system, a capacitor is charged by the drive power supply during normal operation. Upon the detection of an emergency condition, a relay or equivalent switching means switches the capacitor across the positioner coil terminals to provide the electromotive force necessary to move the head support structure across the disk surface. Upon approaching the disk outer edge, the head support structure encounters a mechanical ramp. The mechanical ramp imparts an axial force to the support structure thus unloading the head from the disk.

The capacitor typically supplies a relatively constant voltage across the positioner coil causing the coil and support structure to accelerate as it is moving toward the disk outer edge. As a result, the support structure sometimes contacts the mechanical ramp at a high velocity. The resulting impact can cause the head to oscillate and impact against the disk surface thus causing damage to the disk and head.

SUMMARY OF THE INVENTION

The present invention is directed to an improved means for use in a magnetic disk drive for unloading the heads under emergency conditions. In accordance with one aspect of the invention, a dynamic braking circuit is activated in response to an emergency unload command to reduce the positioner coil velocity toward zero.

In accordance with a further aspect of the invention, a velocity control circuit is activated, a short time delay after the emergency unload command, to move the head support structure at a controlled substantially constant velocity across the disk surface toward the disk outer track.

In accordance with the disclosed embodiment of the invention, the velocity control circuit operates first in a low current mode to move the head support structure at a substantially constant velocity toward the outer track and then in a high current mode to enable the head support structure to climb an unload ramp which moves the heads in an axial direction away from the disk surface.

The novel features of the invention are set forth with particularity in the appended claims. The invention will best be understood from the following description when read in conjunction with the accompanying drawings.

DETAILED DESCRIPTION OF THE DISCLOSED EMBODIMENT OF THE INVENTION

Figure 1:
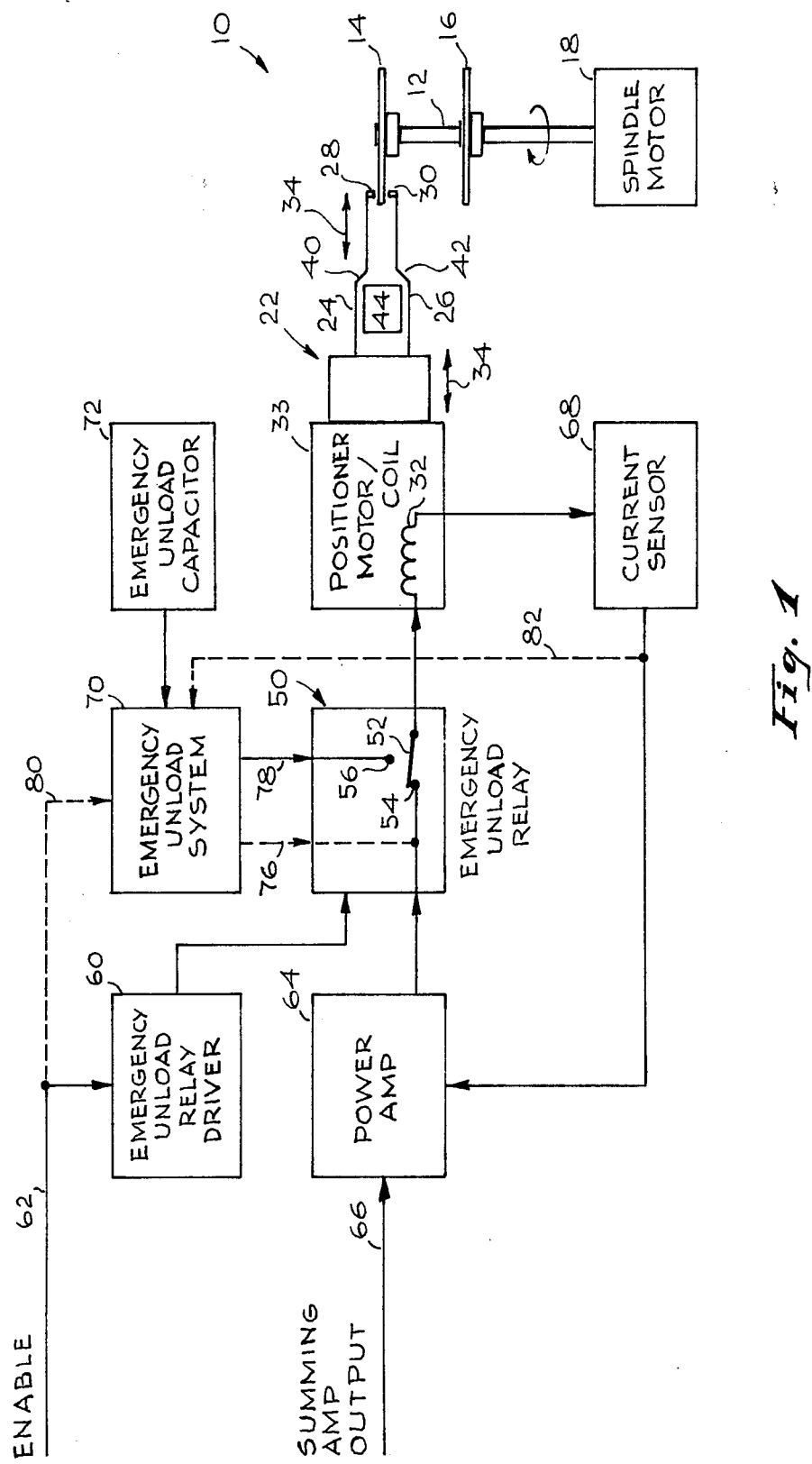
FIG. 1 is a block diagram of a portion of the electronic control system of a typical magnetic disk drive showing in dashed line the modifications in accordance with the present invention.

Attention is initially directed to FIG. 1 which schematically illustrates a magnetic disk drive 10 which includes a spindle 12 supporting one or more magnetic disks 14 and 16. As is well-known in the art, the disks 14 and 16 may either be fixed to the spindle 12 or user-replaceable. The spindle 12 is driven by a spindle motor 18 which rotates the disks 14, 16 about an axis defined by the spindle 12.

As is well-known in the art, the disks 14, 16 have magnetic material coated on either one or both surfaces thereof to enable data to be magnetically recorded thereon. Data is recorded on the disk surfaces by signals applied to a magnetic transducer or head. In a typical disk drive, a head support structure 22 is provided. The support structure 22 typically includes, for each disk, first and second head support arms 24 and 26, respectively carrying heads 28 and 30. The support structure 22 is physically coupled to a positioner coil 32 of a positioner motor 33, which, in response to the application of positioning signals thereto, is capable of linearly moving the support structure 22, as represented by the arrows 34. The support structure 22 is mounted relative to the disks 14, 16 so that the heads 28, 30 move radially with respect to the disk recording surface. That is, the support structure 22 can be moved linearly to enable the heads to be selectively positioned over any one of a plurality of annular recording tracks defined on the disk recording surface.

In normal operation, that is when the heads are writing data onto the disk surface or reading data therefrom, the heads will be loaded. When the heads are loaded, it simply means that a spring force is acting upon the heads, generally through the support arms 24, 26 to force the heads toward the disk surface. As is well-known in the art, the heads are configured so as to actually fly immediately above the disk recording surface so long as the disk is rotating at a certain speed. Typically, the heads may fly on the order of 60 microinches above the disk surface. If, while the heads are positioned above the disk surface, the disk speed happens to fall below a certain value, the heads can no longer fly and will crash into the surface of the disk. Obviously, this type of catastrophe is to be avoided and as a consequence, most modern disk drives incorporate some type of emergency subsystem which senses a power fault or disk speed variation and unloads the heads prior to crashing. The process of unloading the heads generally requires that the support structure 22 be retracted; that is, it should move to the left, as represented in FIG. 1, in order to move the heads 28, 30 toward the outermost annular track on the disk surface.

The support arms 24, 26 are typically provided with ramp surfaces 40, 42 which are used to unload the heads; that is, move them axially away from the disk surface. More particularly, the ramp surfaces 40, 42 are operated in conjunction with a fixed cam 44 which engages the ramp surfaces 40, 42 as the support structure 22 is pulled by the positioner coil 32 to the left (FIG. 1). The engagement of the fixed cam 44 against the ramp surfaces 40, 42 will move the support arms 24, 26 and particularly the heads 28, 30 axially away from the recording surfaces of the disk.

FIG. 1 illustrates in solid line a block diagram of a typical emergency head unload system characteristic of the prior art. The dashed lines illustrate modifications to such a prior art system in accordance with the present invention, as is further detailed in FIG. 2.

Initially considering the typical prior art system represented in solid line in FIG. 1, an emergency unload relay 50 is provided which is represented as a single pole double throw switch. That is, the blade contact 52 can be placed in a first state (illustrated) to connect first input terminal 54 to the positioner coil 32. The emergency unload relay 50 can be switched to a second state in which the contact 52 connects the second input terminal 56 to the positioner motor coil. The state of the emergency unload relay 50 is controlled by the emergency unload relay driver 60. The emergency unload relay driver 60 is responsive to an emergency command signal appearing on the emergency unload enable line 62. More particularly, means (not shown) are provided in a typical disk drive to detect various emergency conditions whose occurrence are intended to initiate an emergency head unload procedure. Such means for detecting these emergency conditions are well-known in the art and it has been assumed herein that an emergency command signal will be applied to the emergency unload enable line 62 upon the detection of such a condition. The emergency unload relay driver 60 will respond to that emergency command signal to switch the state of the emergency unload relay 50 from the first state (illustrated) to the second state in which the contact 52 engages the second input terminal 56.

Although the emergency unload relay 50 is depicted in FIG. 1 as merely comprising a single pole double throw electromechanical switch, it should be recognized that this showing is for convenience only and that other switching means, including all electronic switching circuits, could readily be utilized.

During normal operating conditions, the emergency unload relay contact 52 will be in the first state engaged with input terminal 54. Input terminal 54 is connected to the output of power amplifier 64 which receives as its input the output of a summing amplifier (not shown). The summing amplifier typically provides the positioning command information to the power amplifier. The summing amplifier (not shown) will develop its output signal based upon various inputs such as track position desired, temperature compensation required, etc. In order to move the heads from their present track to any other desired track, the power amplifier 64 will of course supply the appropriate current through the emergency unload relay terminal 54 and contact 52 to the positioner motor coil 32. Typically, a current sensor means 68 is provided to sense the current in the positioner coil. The current sensor is connected back to the power amplifier 64 and provides an error signal thereto which assures that the positioner coil current is made equal to the current intended by the power amplifier 64.

Thus, under normal operating conditions, the contact 52 will be electrically connected to input terminal 54 and the position information supplied on line 66 to the power amplifier will enable the power amplifier to develop an appropriate current in the positioner motor coil 32 to position the heads 28, 30 over the desired annular track on the surface of disks 14, 16.

When an emergency command signal is detected by the emergency unload relay driver 60 on the enable line 62, the emergency unload relay 50 is switched to its second state to connect contact 52 to input terminal 56. This action disconnects the power amplifier 64 from the positioner coil 32 and instead connects the emergency unload system 70 to the positioner coil. The emergency unload system 70 is powered by an emergency unload capacitor 72 which is fully charged during normal operating conditions. The capacitor 72 must be of a size to supply sufficient electrical energy through the emergency unload system 70 to retract the head support arms 24, 26 and pull them over the fixed cam 44 to unload the heads. In typical prior art systems, the fully charged capacitor 72 is connected, during an emergency unload procedure, directly across the positioner motor coil. The capacitor 72 has typically supplied a relatively constant voltage across the coil of a relatively high value since it is of course an objective to retract the heads from the disk surface as quickly as possible. If, at the time the emergency occurs, the heads are over an inner track (i.e., close to the spindle 12), the positioner coil, powered by the capacitor 72, will accelerate over a relatively long stroke meaning that the ramps 40 and 42 will impact against the fixed cam 44 at a relatively high velocity. Under certain conditions, this has caused the support arms 24, 26 to oscillate, thereby on occasion impacting the heads 28, 30 against the disk surface.

Figure 2:
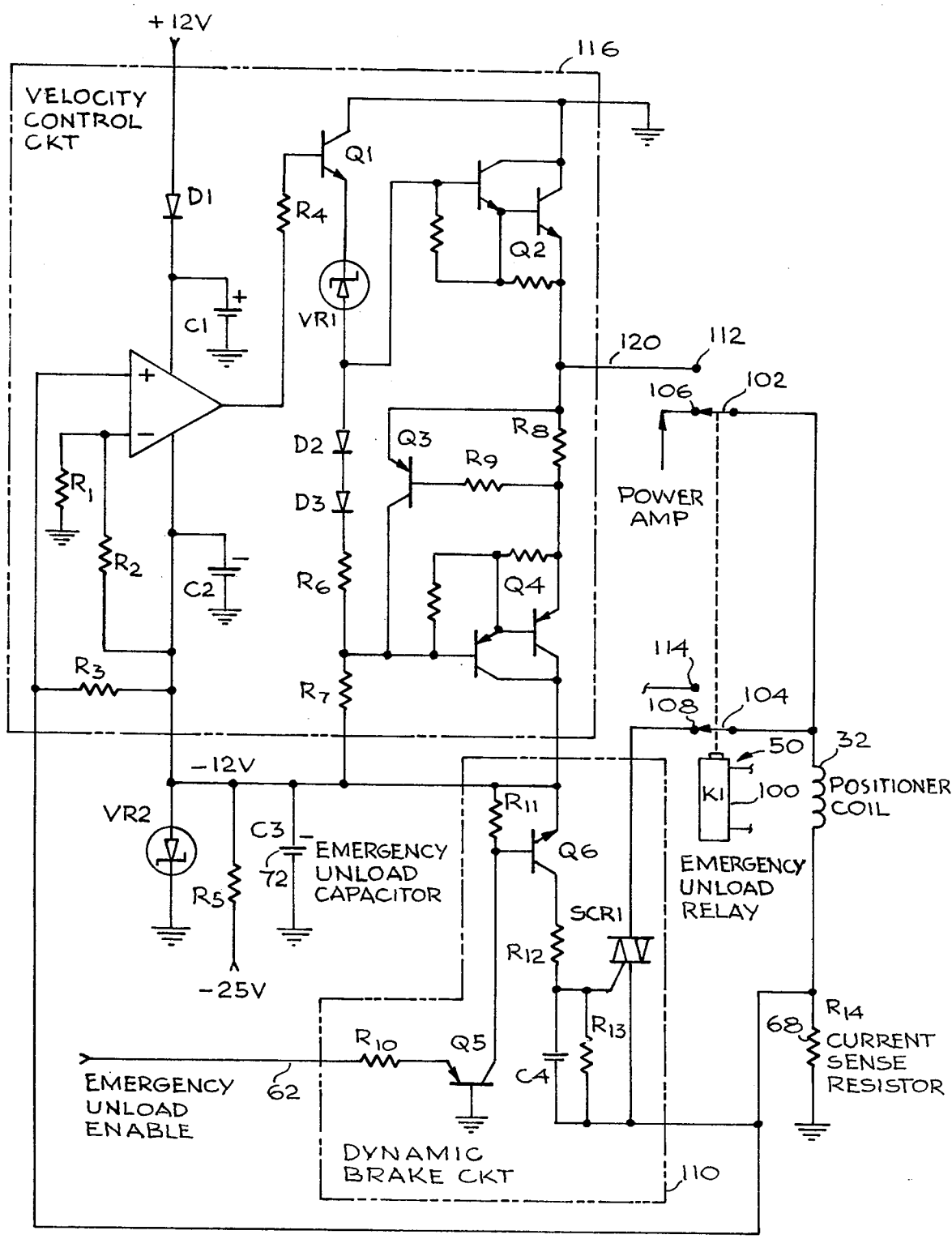
FIG. 2 is a circuit diagram of an exemplary embodiment of the present invention.

The present invention is directed to a modification of an emergency head unload system as depicted in solid line in FIG. 1 for the purpose of reducing the risk of data loss and head or disk damage during the execution of an emergency unload operation. The details of an embodiment of the present invention are illustrated in FIG. 2 and will be explained in conjunction therewith. However, FIG. 1 represents in dashed line the modifications to the typical prior art emergency unload system, in accordance with the present invention.

Briefly in accordance with the present invention, the emergency unload system 70 of FIG. 1 includes a dynamic brake circuit and a velocity control circuit. The output of the dynamic brake circuit is represented by output line 76 connected to emergency unload relay input terminal 54. The output of the velocity control circuit is represented by output line 78 connected to the emergency unload relay second input terminal 56. Additionally, the emergency unload system 70 has an input control terminal 80 which is connected to the emergency unload enable line 62. Briefly, upon the detection of an emergency command signal on enable line 62, the emergency unload system 70, in accordance with the invention, activates its dynamic brake circuit to create, via line 76, an electrical short across the positioner motor coil. The positioner motor typically comprises a voice coil mounted for linear movement within a permanent magnet field. The electrical short across the positioner motor coil produces a back electromotive force in the coil opposing the motion of the coil. Thus, regardless of the action of the coil at the instant the emergency command signal is recognized, the effect of the electrical short will be to reduce the coil velocity to substantially zero. It should be recognized that at the instant of the occurrence of the emergency command signal the heads can be in fixed position over a track, or can be seeking a track moving either radially inwardly or outwardly. Regardless, the function of the dynamic brake circuit of the emergency unload system 70 is to reduce the coil velocity to substantially zero. After a short time delay introduced by the emergency unload relay driver 60, the emergency unload relay 50 switches to its second state. The emergency unload system velocity control circuit then supplies a current to the positioner motor coil 32. Initially, the velocity control circuit provides a substantially constant current to the coil to retract the heads at a controlled low velocity which is insufficient to permit movement of the ramps 40, 42 past the fixed cam 44. As the coil velocity slows upon engagement of the cam 44 against the ramps 40, 42, the coil current increases. The coil current is sensed by the current sensor 68 which, via line 82, switches the velocity control circuit into a high current mode to supply sufficient energy to the positioner coil to enable the ramps 40, 42 to move past the fixed cam 44.

Attention is now directed to FIG. 2 which illustrates a detailed embodiment of the emergency unload system 70, as well as the emergency unload capacitor 72, the emergency unload relay 50, the positioner coil 32, and the current sensor 68, all of FIG. 1. In FIG. 2, the emergency unload relay 50 is illustrated as comprising a solenoid 100 operating a double pole double throw switch. The double pole double throw switch includes blade contacts 102 and 104. During normal operating conditions, the blade contacts 102 and 104 are in the solid line position illustrated respectively contacting input terminals 106 and 108. Input terminal 106 is connected to the output of the power amplifier 64 of FIG. 1. Input terminal 108, as will be seen hereinafter, is connected to the output of the dynamic brake circuit 110 which comprises a portion of the emergency unload system 70.

In the second state of the double pole double throw switch means, the blade contacts 102 and 104 move into contact with input terminals 112 and 114 respectively. Input terminal 112 is connected to the output of the velocity control circuit 116 which, as has been previously mentioned, forms part of the emergency unload system 70 of FIG. 1. Input terminal 114 is not utilized in the disclosed embodiment of the invention.

FIG. 2 also illustrates the emergency unload capacitor 72 previously mentioned in the description of FIG. 1. Zener diode VR2 and resistor R5 operate in conjunction with the emergency unload capacitor 72 (C3) to charge the capacitor to substantially $-12$ volts during normal operating conditions. As will be seen hereinafter, during emergency conditons, the capacitor 72 provides the power necessary to operate the dynamic braking circuit 110 and the velocity control circuit 116.

During an emergency condition, a high logic level signal will be applied to the emergency unload enable line 62. This action causes transistor Q5 to turn on. This action in turn provides base drive for transistor Q6 controlled by resistor R10. When transistor Q6 conducts, the gate circuit of the triac SCR1 will receive a negative bias current controlled primarily by the value of resistor R12 thereby turning the triac on. As a consequence, the triac SCR1 will produce a very low resistance (essentially an electrical short) shunt path across the positioner coil 32 via the switch means input terminal 108 and blade contact 104.

It has previously been mentioned that the emergency unload relay driver 60 provides a certain time delay, e.g. 20-30 milliseconds. During this interval and prior to the contacts 102 and 104 switching to the second state, the velocity of the positioner coil will be reduced substantially to zero as a consequence of the short circuit across the positioner coil. When the contacts switch to the second state after the 20-30 millisecond interval, the positioner coil velocity should be substantially zero and the dynamic braking circuit 110 will be thereafter disconnected from the positioner coil. Resistors R11 and R13 provide turn-off bypass for transistor Q6 and triac SCR1 respectively. Capacitor C4 is provided to suppress false triggering of the triac SCR1 due to noise.

After the 20-30 millisecond delay introduced by the emergency unload relay driver 60 (FIG. 1), the switch contacts 102 and 104 move to their second state to thus connect the output of the velocity control circuit 116 to the positioner coil 32. As will be seen hereinafter, the velocity control circuit 116 operates in two modes. In the first low voltage low current mode, a voltage on the order of 4-5 volts will be established by transistor Q4 on the velocity control circuit output terminal 120. During this mode, the positioner coil will be retracted at a controlled low velocity to move the previously mentioned ramp surfaces to the fixed cam 44 (FIG. 1). As the cam 44 contacts the ramp surfaces, the coil velocity slows, thereby increasing the coil current. As will be seen hereinafter, this action is sensed and switches the velocity control circuit 116 to a high current, high voltage mode in which the transistor Q4 supplies approximately an 8-volt potential at the velocity control circuit output terminal 120 to enable the ramp surfaces 40, 42 of the support arms to climb the fixed cam 44.

During an unload sequence, the positioner coil current is sensed at the positive input of the operational amplifier U1 by measuring the voltage drop across the coil current sensing resistor R14. A current sensing threshold is established by the resistor voltage divider network formed by resistors R1 and R2. When the positioner coil current is below the threshold established by resistors R1 and R2, the positive output of amplifier U1 will drive transistor Q1 into saturation by forward biasing its base collector junction. Resistor R4 limits the base current to transistor Q1. The voltage drop across Zener diode VR1 essentially establishes the low output voltage. The voltage across diodes D2 and D3, plus that across resistor R6, is nearly compensated for by the $V_{DE}$ drop across the Darlington output transistor Q4 plus the voltage drop across resistor R8. Resistor R8 acts to sense the output current of the velocity control circuit and operating in conjunction with resistor R9 at transistor Q3, provides current limiting in case of a short circuit to ground.

The purpose of transistor Q2 is to supply dynamic braking to assure that the velocity of the positioner coil does not exceed a certain value while being retracted. More particularly, if the positioner coil velocity is too high, the back EMF produced by the coil will become more negative than the control voltage at output terminal 120. As a consequence, transistor Q2 will conduct, thus presenting a low impedance path to the coil and causing transistor Q4 to turn off. The velocity of the coil will thus decrease until the desired velocity is attained causing transistor Q4 to turn on and transistor Q2 to come out of conduction. The alternate conduction of transistors Q2 and Q4 (push-pull) acts to maintain the positioner coil velocity substantially constant.

The low output voltage mode of the velocity control circuit, i.e., when transistor Q1 is conducting, is designed to provide the desired positioner coil retract velocity during an unload situation. The magnitude of the retract control voltage, is, however, normally not adequate to allow the support arm ramp surfaces 40, 42 (FIG. 1) to retract over the fixed cam 44 and thus unload the heads. In order for the ramp surfaces to climb over the cam 44, a much higher voltage is normally required. The velocity control circuit 116 provides for the necessary voltage boost by switching off transistor Q1. The key to switching the velocity control circuit into the high output mode is the current in the positioner coil 32.

More particularly, during an unload operation, the head supporting structure will retract at a controlled low velocity until the unload ramps 40, 42 encounter the fixed cam 44 (FIG. 1). The velocity of the head supporting structure will be reduced to zero if there is insufficient inertia to allow the support arm ramps to climb the cam 44. With the velocity of the positioner coil at or near zero, the current in the coil will rapidly increase. When the coil current exceeds the threshold established by resistors R1 and R2 at the input to operational amplifier U1, the output of amplifier U1 will switch negative causing transistor Q1 to come out of conduction. The output of the velocity control circuit 116 will switch to a high negative value, determined primarily by resistor R7, as transistor Q4 switches into full conduction. The final voltage value established in output terminal 120 by the velocity control circuit 116 depends upon the charge remaining on the emergency unload capacitor C3 and the $V_{CE}$ drop across transistor Q4.

From the foregoing, it should now be apparent that an emergency head unload subsystem has been disclosed herein for use in magnetic disk drives for unloading the heads from the disk surface. The invention is characterized by the utilization of a dynamic brake circuit which, in response to an emergency condition, initially reduces the velocity of the positioner coil to substantially zero. Thereafter, the velocity control circuit supplies a relatively low but constant voltage to the positioner coil constant voltage to the positioner coil to retract it at a controlled low velocity. As the coil velocity slows upon the ramps encountering the fixed cam, the voltage provided by the velocity control circuit to the positioner coil is boosted to move the head supporting structure ramps over the cam.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. In a disk drive including a disk having a magnetic surface and a motor having a positioner coil for radially moving a head support structure along said disk surface, apparatus responsive to an emergency condition for causing said coil to rapidly move said support structure radially outwardly at a controlled velocity, said apparatus comprising:

switch means having first and second input terminals and including means capable of selectively defining a first state to connect said first input terminal to said positioner coil or a second state to connect said second input terminal to said positioner coil;

brake circuit means electrically connected to said first input terminal and responsive to a signal indicative of said emergency condition for reducing the velocity of said positioner coil toward zero;

means responsive to said emergency condition signal for switching said switch means from said first to said second state after a predetermined time delay;

velocity control circuit means connected to said second input terminal for supplying a substantially constant current through said switch means to said positioner coil;

emergency power supply means; and means for connecting said emergency power supply means to said brake and velocity control circuit means to supply power thereto during said emergency condition.

2. The apparatus of claim 1 wherein said brake circuit means includes means for creating an electrical short across said positioner coil.

3. The apparatus of claim 1 including means for sensing the current level in said positioner coil;

said velocity control circuit means including means responsive to said positioner coil current exceeding a certain level for increasing the current supplied by said velocity control circuit means to said positioner coil.

4. The apparatus of claim 1 further including means responsive to said positioner coil velocity exceeding a predetermined velocity for reducing the velocity thereof.

5. The apparatus of claim 1 wherein said velocity control circuit means further includes means responsive to said positioner coil velocity exceeding a predetermined velocity for modifying said current supplied to said coil to reduce the velocity thereof.

6. An emergency head unload system for a magnetic disk drive including a positioner coil coupled to a support structure carrying a head, said support structure including a ramp surface positioned to engage a fixed cam as said support structure is moved radially outwardly over a disk surface to move said head axially with respect to said surface, said system comprising:

means for supplying an emergency signal indicative of an emergency condition;

means for producing a very low-resistance shunt path across said positioner coil for a limited time interval following said emergency signal to brake the velocity of said coil to substantially zero;

velocity control means active after said limited time interval for initially supplying a substantially constant current to said positioner coil to move said support structure ramp surface to said fixed cam at a controlled low velocity;
emergency power supply means; and
means for supplying electrical power from said emergency power supply means to both said means for producing a shunt path and said velocity control means during said emergency condition.

7. The system of claim 6 wherein said velocity control means includes means responsive to the velocity of said positioner coil increasing above a certain level for modifying the current in said positioner coil to reduce the velocity thereof.

8. The system of claim 6 wherein said velocity control means includes means responsive to the velocity of said positioner coil decreasing below a certain level for modifying the current in said positioner coil to increase the velocity thereof.

9. The system of claim 6 including means for sensing the current level in said positioner coil and responsive to said level exceeding a predetermined level for substantially increasing the current supplied by said velocity control means to said positioner coil to move said ramp surface over said fixed cam.

10. The apparatus of claim 1 wherein said emergency power supply means includes a capacitor and means for charging said capacitor during normal operating conditions of said disk drive.

11. The apparatus of claim 6 wherein said emergency power supply means includes a capacitor and means for charging said capacitor during normal operating conditions of said disk drive.

* * * * *